Aug. 5, 1924.
W. KRAMER
1,503,509
AUTOMOBILE LICENSE PLATE AND HOLDER THEREFOR
Filed May 11, 1923 2 Sheets-Sheet 1
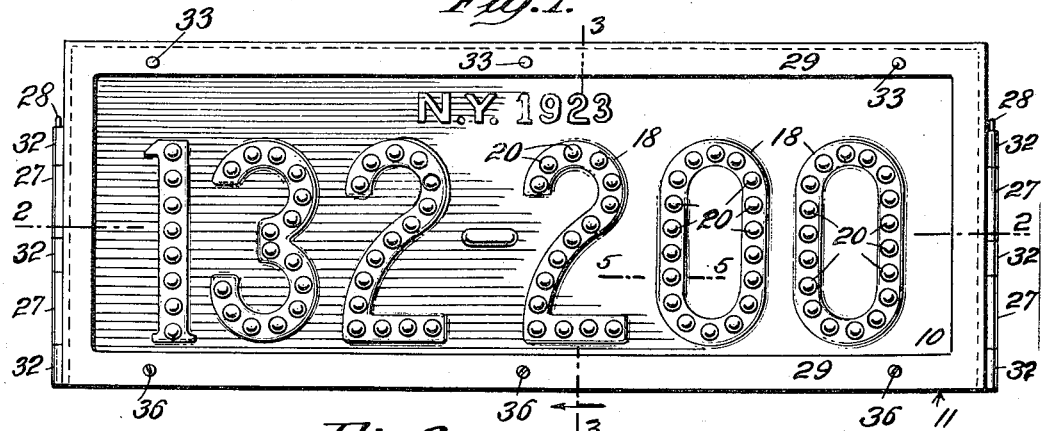
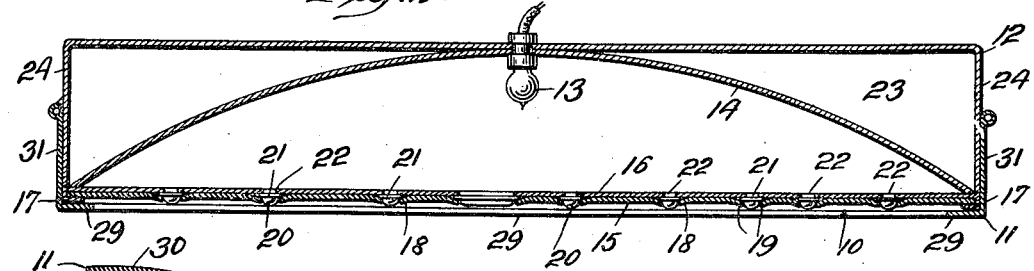
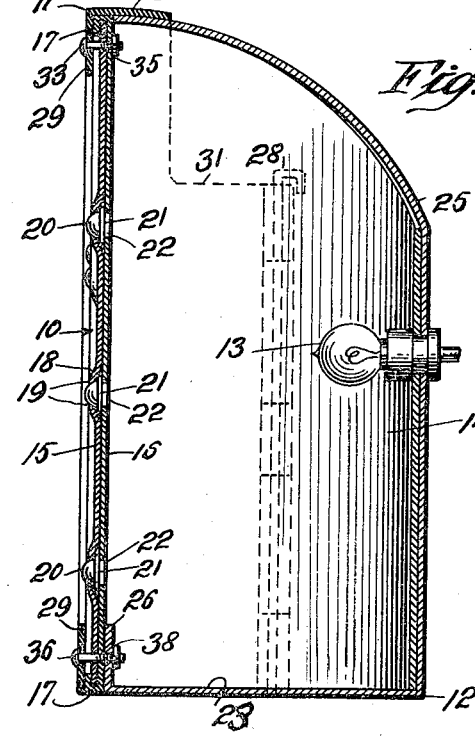
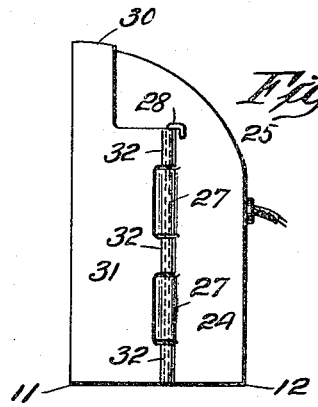
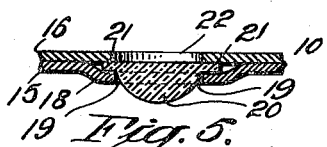
Inventor:
William Kramer.
By his Attorney,
Charles C. Gill.

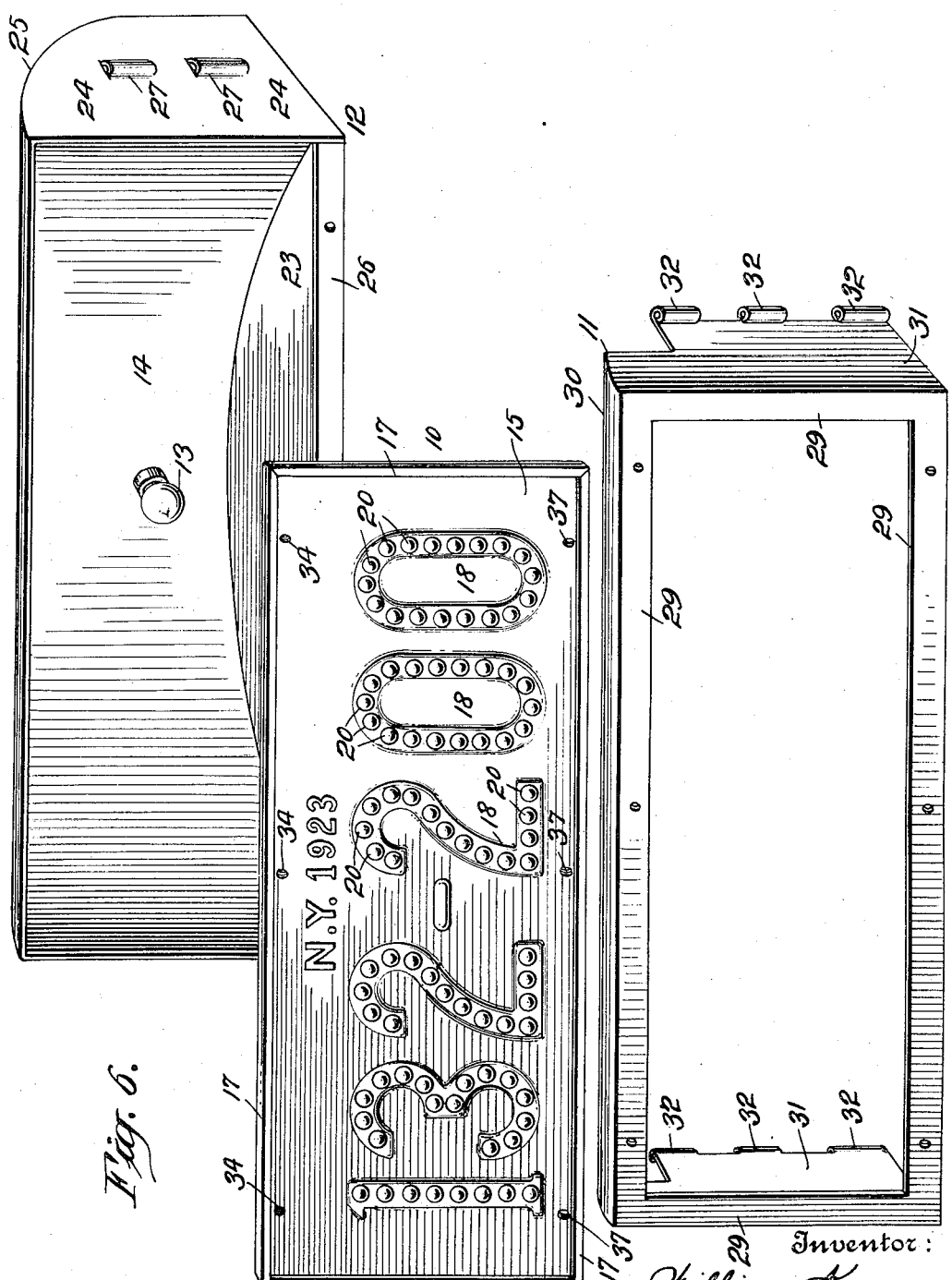

Patented Aug. 5, 1924.

1,503,509

UNITED STATES PATENT OFFICE.

WILLIAM KRAMER, OF NEW YORK, N. Y., ASSIGNOR TO SPOT-LIGHT LICENSE PLATE AND MFG. CO., INC., OF NEW YORK, N. Y., A CORPORATION OF NEW YORK.

AUTOMOBILE LICENSE PLATE AND HOLDER THEREFOR.

Application filed May 11, 1923. Serial No. 638,210.

*To all whom it may concern:*

Be it known that I, WILLIAM KRAMER, a citizen of the United States, and a resident of New York city, in the county of New York and State of New York, have invented certain new and useful Improvements in Automobile License Plates and Holders Therefor, of which the following is a specification.

The invention relates to a novel license plate and holder therefor for use on automobiles and other vehicles, and said invention consists in the novel features, structure and combinations of parts hereinafter described, and particularly pointed out in the claims.

The license plate of this invention has the license numbers in their customary location on the plate and contrasting in color with that of the face of the plate, and these numbers which are preferably embossed or in relief have a series of closely arranged holes or openings formed through them into which convex glass disks or eyes are set and which disks or eyes prominently define the outlines of the numbers on the plate. The means of securing or setting the glass disks or eyes will be explained hereinafter. The license plate bearing the numerals and carrying the glass disks or eyes set therein, is secured within a casing or holder composed of a front section and a rear section, said sections being secured together and the front section having an opening therein to expose the face of the license-plate and more particularly the numerals on the plate, while the rear section houses an electric lamp-bulb and a reflector therefor arranged to direct the rays of light against the back of the license plate. The numerals on the license plate may be readily observed during the day without the aid of the lamp and reflector, and at night the light from the lamp renders said numerals very conspicuous by reason of the presence of the aforesaid convex glass disks or eyes.

One object of the invention is to provide a license plate holding means which will prevent the rapid changing of license plates by unauthorized persons, as by a person stealing a car and substituting a false plate for the one on the car.

Another object of the invention is to provide a license plate whose number is rendered very conspicuous at night and can be read from a considerable distance.

The invention will be readily understood from the detailed description hereinafter presented, reference being had to the accompanying drawings, in which:

Fig. 1 is a front elevation of a license plate and holder therefor embodying the invention;

Fig. 2 is a horizontal section through the same taken on the dotted line 2—2 of Fig. 1;

Fig. 3 is a vertical transverse section through the same taken on the dotted line 3—3 of Fig. 1.

Fig. 4 is an end view, on a smaller scale, of the same;

Fig. 5 is a sectional view through a portion of the license plate, taken on the dotted line 5—5 of Fig. 1, and Fig. 6 is a perspective view of the license plate and the front and back sections of the holder or casing therefor shown juxtaposed for assembly.

In the drawings, 10 designates the license plate, 11 the front member of the casing or holder therefor and 12 the back member of said casing or holder, said member 12 enclosing an electric lamp bulb 13 and a suitable reflector 14 for directing the rays of light in a direction toward the back of the license plate 10

The license plate 10 is of special construction and comprises a front plate 15 and a back plate 16, these plates being in face to face contact and the back plate 16 having a marginal flange 17 folded upon and embracing the edges of the plate 15 and thereby securing said plates 15, 16 together. The license plate is of the usual oblong shape and the member 15 thereof is provided with the requisite numerals 18 indicating the proper license-number for a car, these numerals varying with relation to each license granted and the license-number shown in the drawing being illustrative only, the invention not being limited to any special numerals that the plate 15 may carry. The numerals 18 are in relief or embossed, and therefore stand frontwardly from the body of the plate 15, and said numerals will contrast in color with the body of the plate 15, the numerals, for instance, being in white and the body of the plate 15 being blue or black or some other color as the case may be. Each numeral of the plate 15 is formed with a series of rather closely related openings 19 and within these openings are placed convex glass lenses or eyes 20, each eye 20 having a flat back portion and a disk-flange 21 surrounding the convex portion. as more clearly shown in Fig. 5. The eyes 20 conspicuously define the numerals and constitute therefor numerals in themselves.

The back-plate or member 16 of the license-plate is a flat plate, and it is formed with apertures 22 corresponding with the openings 19 in the front member or plate 15, and the said plate 16 at the edges of the openings 22 therein engage the annular flanges 21 of the eyes 20, as shown in Fig. 5, and thereby the eyes 20 become firmly secured in place with their convex portions projecting forwardly through the openings 19 in the plate member 15, as shown in Fig. 3.

The license plate proper therefore consists of the plate members 15, 16 flanged together at their edges, the member 15 bearing the numerals both in outline and by the presence of the glass eyes 20, and the plate member 16 being positioned against the back of the plate member 15 and serving as a means for simultaneously locking all of the eyes 20 of all of the numerals in fixed position within the openings 19 of the plate member 15.

The back member 12 of the casing or holder for the license plate presents an oblong open front corresponding with the shape and size of the license plate 10, as shown in Figs. 2 and 3, and said casing member 12 will be formed with a bottom 23, ends 24 and a combined back and hood 25, the hood-portion being at the top of the member 12 and curving downwardly and rearwardly to the vertical portion of the back of said member 12. The bottom 23 of the casing member 12 has at its front edge an upwardly bent flange 26, shown in section in Fig. 3 and by solid lines in Fig. 6, and the ends 24 of said member 12 have vertical plain front edges which engage the back of the plate 10 at its vertical end edges, while the upper forward edge of said rear member 12 is plain and engages the plate 10 along its upper edge, as shown in Fig. 3. At its opposite ends the metal of the rear member 12 of the casing or holder, is pressed outwardly to form two vertical sleeves 27 which are employed in connection with pins 28, to secure the members 11, 12 of the casing together, as hereinafter explained.

The front member 11 of the casing or holder for the license plate, is of oblong outline and adapted to receive the license plate and expose the numerals thereon through the open front of said member. The front of the member 11 is a plain flat flange 29 of oblong shape defining an oblong open front and against which flange the edge portion of the license plate 10 is placed. The member 11 has a rearwardly extending top 30 which closely engages the forward portions of the top of the member 12, as shown more clearly in Fig. 3, and said member 11 has ends 31 which pass upon and enclose the front portions of the ends 24 of the back-member 12, as shown in Figs. 2 and 4. The lower front edge of the member 11 is plain and engaged by the lower edge portions of the license plate 10, as shown in Fig. 3. At the rear vertical edges of the ends 31 of the casing member 11, the metal thereof is flanged and curled to form three sleeves 32, and these sleeves match with the sleeves 27 of the casing member 12 to receive the pins 28, as shown in Fig. 4, the middle sleeve 32 being between the two sleeves 27, the top sleeve 32 being above the upper sleeve 27 and the bottom sleeve 32 being below the lower sleeve 27, thereby forming a long bearing for the pins 28 which connect, at the ends of the holder, the members 11, 12 thereof together.

In assembling the several parts of the license plate and its holder or casing, the plate 10 may be inserted within the front casing member 11 from the back thereof and secured to said member by means of a series of bolts 33 which extend through the upper member of the flange 29 and through openings 34 (Fig. 6) in the license plate and receive at their inner ends the nuts 35, which finally become concealed behind the license plate and within the chamber of the holder. The rear member 12 may then be associated with the front member 11 and against the edges of the license plate and secured by means of bolts 36 which pass through the lower portion of the flange 29 of the front member 11 and through holes 37 in the license plate and engage nuts 38 brazed to the inner face of the vertical flange 26 which is rigid with the casing member 12. The upper portion 30 of the front member 11 and the corresponding portion of the rear member 12 are curved, and this curvature, after the bolts 33, 36 have been applied, aid in the firm assembly of the holder or casing parts together. The vertical pins 28 are inserted within the sleeves 27, 32 and they serve as means for connecting the casing members 11, 12 together. If the rear member 12 has been permanently secured to the car, the front member 11 carrying the license plate will be applied to the said member 12, and in this assembly the top 30 of the member 11 will serve as a hook to suspend the member 11 on the member 12 while the bolts 36 and pins 28 are being applied to position.

The license-plate and holder therefor, hereinbefore described is of durable character and special efficiency and may be readily manufactured, being wholly of sheet metal, with the exception of the eyes 20, which are of glass and of a form to brilliantly display the license number at night. All of the eyes 20 are firmly and simultaneously secured in position by means of the back plate 16 and its flange 17, and the front convex portions of said eyes project forwardly beyond the front plate 16 and beyond the embossed numerals 18 thereon. The complete license plate composed of the members 15, 16 and eyes 20 may be handled as a unit, and the members 11, 12 of the casing for holding said plate are each in unit form, and hence the structure may be readily assembled.

Ordinarily a license plate may be very quickly removed from a car and a false plate substituted therefor, and one of the purposes of this invention is to provide a plate and holder which will require at least a moderate length of time for the substitution of a false plate for the one on the car.

What I claim as my invention and desire to secure by Letters Patent, is:

1. A license plate and holder therefor for automobiles and the like, said plate being oblong and bearing the necessary license numerals in conspicuous permanent outlines and said numerals each being closely apertured by a single row of holes, said plate being solid except at said apertures defining the numerals and the general face of said plate and that of said numerals having contrasting colors, and said numerals being embossed forwardly and forming a recess or chamber behind them, and a series of glass eyes having convex forward portions projecting through said apertures and themselves defining the same numerals, said eyes at their back portions being seated in said recesses behind the numerals and closely engaging the edges of the apertures in the numerals, and said holder being secured to said plate and having a chamber at the back thereof containing an electric lamp bulb and a reflector.

2. A license plate and holder therefor for automobiles and the like, said plate being oblong and bearing the necessary license numerals in conspicuous permanent outlines and said numerals each being closely apertured by a single row of holes, said plate being solid except at said apertures defining the numerals and the general face of said plate and that of said numerals having contrasting colors, and said numerals being embossed forwardly and forming a recess or chamber behind them, and a series of glass eyes having convex forward portions projecting through said apertures and themselves defining the same numerals, said eyes at their back portions being seated in said recesses behind the numerals and closely engaging the edges of the apertures in the numerals, and a back plate apertured in line with said eyes and engaging circumferential portions of said eyes and being secured to said front plate for securely positioning said eyes, and said holder being secured to said plate and having a chamber at the back thereof containing an electric lamp bulb and a reflector.

3. A license plate and holder therefor for automobiles and the like, said plate being oblong and bearing the necessary license numerals in conspicuous permanent outlines and said numerals each being closely apertured by a single row of holes, said plate being solid except at said apertures defining the numerals and the general face of said plate and that of said numerals having contrasting colors, and said numerals being embossed forwardly and forming a recess or chamber behind them, a series of glass eyes having convex fronts at said apertures and annular laterally extending flanges at their back portions seated in the recess or chamber in the plate behind the respective numerals, and a back plate having openings in line with said apertures and engaging said flanges and being secured to said front plate for securely positioning said eyes, and said holder being secured to said plate and having a chamber at the back thereof containing an electric lamp bulb and a reflector.

4. A license plate and holder therefor for automobiles and the like, said plate being oblong and bearing the necessary license numerals in conspicuous permanent outlines and said numerals each being closely apertured by a single row of holes, said plate being solid except at said apertures defining the numerals and the general face of said plate and that of said numerals having contrasting colors, and a series of glass eyes having convex forward portions projecting through said apertures and themselves defining the same numerals, and a back plate apertured in line with said eyes and engaging circumferential portions of said eyes and being at its edges folded upon and embracing the edges of said front plate, thereby securing said plates together and firmly positioning said eyes, and said holder being secured to said plate and having a chamber at the back thereof containing an electric lamp bulb and a reflector.

5. A license plate and holder therefor for automobiles and the like, said plate bearing the necessary numerals and being closely apertured on and along said numerals, and said holder being a casing formed of a front section and a back section, the back section defining a chamber at the back of the license plate containing an electric lamp bulb and a reflector and said section having a top, back, sides and a bottom having an upwardly extending flange at its front edge, and said front section having an open front fitting against the license plate, a top engaging and resting upon the forward portion of said back section and sides which embrace and are secured to the sides of said back section, the parts being further secured together by bolts extending through the upper edge of said front and said license plate and by bolts extending through the lower edge of said front, said license plate and said upwardly extending flange.

Signed at New York city, in the county of New York and State of New York, this 10th day of May A. D. 1923.

WILLIAM KRAMER.